April 26, 1960   G. M. R. WINKLER   2,934,702
PULSE TIME DIFFERENCE MEASUREMENT
Filed Dec. 16, 1958
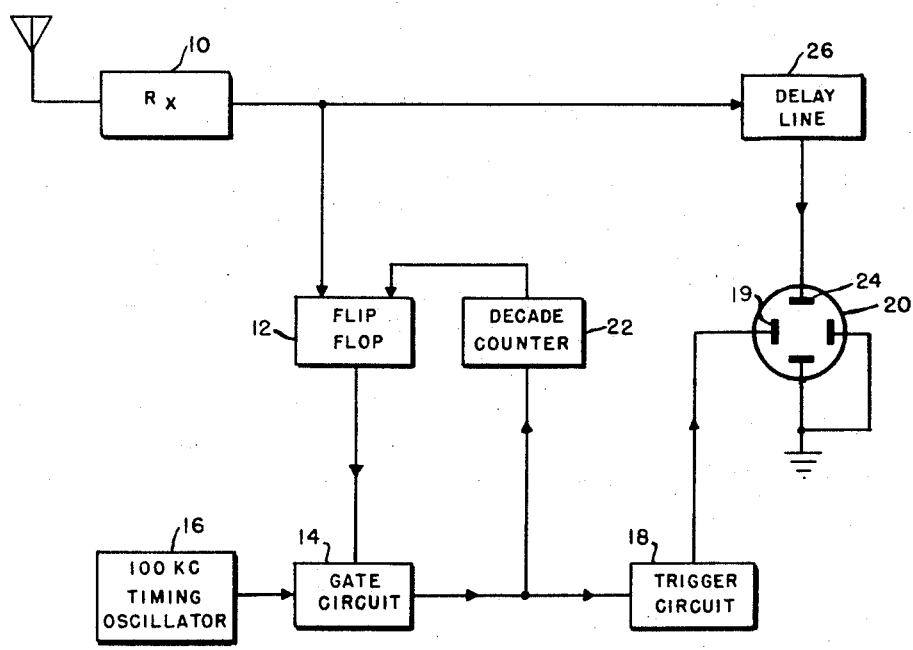
INVENTOR,
GERNOT M. R. WINKLER
BY Harry M. Saraporitz
ATTORNEY.

United States Patent Office 2,934,702
Patented Apr. 26, 1960

2,934,702

PULSE TIME DIFFERENCE MEASUREMENT

Gernot M. R. Winkler, Long Branch, N.J., assignor to the United States of America as represented by the Secretary of the Army Application December 16, 1958, Serial No. 780,905

5 Claims. (Cl. 324—68)

(Granted under Title 35, U.S. Code (1952), sec. 266)

The invention described herein may be manufactured and used by or for the Government for governmental purposes, without the payment of any royalty thereon.

This invention relates to systems for measuring recurring time intervals and more particularly to a system for measuring the exact time difference of two recurring pulses, one of which is very weak and embedded in noise.

While both the counter and scope reading methods of measuring the time differences between recurring pulses are well known in the art, it has been found that neither of these methods properly provide accurate time measurements when one of the recurring pulses is so weak that it is almost entirely masked by noise. In addition, the prevailing scope reading methods are limited to measurements of rather short time intervals. It is a specific object of the present invention to provide a pulse time interval measuring system wherein such limitations are overcome.

It is another object of the present invention to provide a pulse time interval measuring system which permits exact measurement of relatively long time intervals and is not duly affected by noise.

In accordance with the invention, the system for measuring the time interval between two successive detected received pulse signals includes means for generating uniformly spaced pulses at a prescribed frequency and a counter adapted to produce a single output pulse in response to a preset number of the uniformly spaced pulses. Also included are a cathode-ray tube indicator having horizontal and vertical beam deflection means and a trigger circuit having its output in circuit with the horizontal beam deflection means. Included further are means including a gating circuit for simultaneously applying the uniformly spaced pulses to the inputs of the counter and trigger circuits only for a duration corresponding to the time between the first of the recurring pulses and the counter output pulse. The trigger circuit is adapted to produce an output pulse for each of the applied input pulses such that the horizontal sweep traces are generated in synchronism therewith. In addition, there is included means for applying the detected pulse signals to the vertical deflection means whereby the first of the detected signals is made to occur at the beginning of the horizontal sweep traces. The counter is adjusted such that the second detected signal is visible on the face of the cathode-ray tube indicator for a given number of the uniformly spaced pulses, and not visible thereon for a count of one pulse less than the given number.

For a better understanding of the present invention, together with other and further objects thereof, reference is had to the following description taken in connection with the accompanying drawing which shows a block diagram illustrating one embodiment of the invention.

Referring now to the drawing, at 10 there is shown a receiver adapted to detect recurring pulses reflected from a target illuminated in the usual manner by transmitted pulsed radio-frequency energy. The first pulse output from receiver 10 is assumed to be strong enough to trigger a flip-flop or bistable multivibrator circuit 12. A gate circuit 14 is responsive to the output of flip-flop 12 such that the gate circuit is in the open position for one output level from bistable multivibrator 12 and in the closed position for the other output level therefrom. Applied to the input of gate circuit 14 is the output from a continuously running fixed frequency oscillator 16 which is preferably crystal controlled to provide a pulsed frequency output of 100 kc. or any other convenient frequency suitable for timing purposes. When gate circuit 14 is in the open position, the output frequency from oscillator 16 is passed therethrough to a conventional trigger circuit 18, the output of which is applied to one of the horizontal deflection plates 19 of a cathode-ray tube indicator 20 such that each output trigger pulse from circuit 18 provides a horizontal sweep trace on the face of cathode-ray tube indicator 20. By this arrangement, the horizontal trace trigger pulses are in synchronism with the output pulses from oscillator 16 when gate circuit 14 is opened so that each of the output pulses from oscillator 16 passing through gate circuit 14 will initiate a horizontal trace. As shown, the fixed frequency pulses from oscillator 16 passing through gate circuit 14 are also applied to a conventional decade counter 22, the output of which is applied as a trigger pulse to flip-flop circuit 12 to change the output level therefrom. Thus it can be seen that flip-flop circuit 12 responds alternatively to the receiver and decade counter 22 output signals. The first detected output from receiver 10 will provide an output level from flip-flop circuit 12 which opens gate circuit 14, while the output from decade counter 22 will provide an output level from flip-flop circuit 12 which closes gate circuit 14. When gate circuit 14 is closed, no pulses are applied therethrough from oscillator 16 to trigger circuit 18. The output of receiver 10 is also applied to one of the vertical deflection plates 24 of cathode-ray tube indicator 20 through a delay circuit 26.

In operation, the decade counter 22 is preset to count a prescribed number of output pulses derived from oscillator 16 when gate circuit 14 is opened by one of the output levels from flip-flop circuit 12 and, when the count is completed, a counter pulse is produced. The first detected pulse output from receiver 10, of course, triggers the flip-flop to provide the proper gating signal to open circuit 14. As a result, the 100 kc. timing pulses passing through gating circuit 14 initiate corresponding periodically recurring horizontal sweep traces on cathode-ray tube indicator 20 until the gate circuit is closed by the application of the counter pulse to flip-flop circuit 12. The output from receiver 10 is adjusted by means of delay circuit 26 so that the first detected pulse is positioned at the beginning of the horizontal sweep. If the preset decade counter time is longer than the pulse time difference between two recurring signals, a second detected signal will be observed on the face of cathode-ray tube indicator 20. The dial setting of the decade counter 22 is now reduced until the second signal just disappears after which the setting of the decade counter 22 is increased by only one pulse so that the second detected pulse becomes visible again. The dials of the counter can now be read and the next cycle interpolated on the face of the cathode-ray tube indicator 20. It can be seen that the system provides a combination of the oscilloscope reading method and the counting method for determining the difference between recurring signal pulses. The oscilloscope not only serves as a sensitive means to detect a weak signal masked by noise, but also functions as an interpolation feature to produce the next cycle of the time measured. The decade counter 22, however, allows the exact measurement of relatively long time intervals and is not affected in any manner by noise.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a receiver system including means for detecting recurring pulsed radio-frequency signals, means for measuring the time interval between two successive recurring pulse signals comprising, means for generating uniformly spaced pulses at a prescribed frequency, a counter adapted to produce a single output pulse in response to a preset number of said uniformly spaced pulses, a cathode-ray tube indicator having horizontal and vertical beam deflection means, a trigger circuit having its output in circuit with said horizontal beam deflection means, means including a gating circuit for simultaneously applying said uniformly spaced pulses to the inputs of said counter and said trigger circuit only for a duration corresponding to the time between the first detected signal and the output pulse of said counter, said trigger circuit being adapted to produce an output pulse for each of the applied input pulses whereby horizontal sweep traces on said cathode-ray tube indicator are generated in synchronism with the applied input pulses, means for applying the detected pulse signals to said vertical deflection means whereby the first of said detected signals occurs at the beginning of the horizontal sweep traces, said counter being adjusted such that the second detected signal is visible on the face of said cathode-ray tube indicator for a given number of said uniformly spaced pulses and not visible thereon for a count of one pulse less than said given number.

2. In a receiver system including means for detecting recurring pulsed radio-frequency signals, means for measuring the time interval between two successive recurring pulse signals comprising, means for generating uniformly spaced pulses at a prescribed frequency, a counter adapted to produce a single output pulse in response to a preset number of said uniformly spaced pulses, means alternately responsive to the first detected signal and the output of said counter for producing respective first and second discrete voltage levels, a cathode-ray tube indicator having horizontal and vertical beam deflection means, a gating circuit interconnecting said counter and said prescribed frequency generating means and responsive to said voltage levels whereby said gating circuit is opened to pass said uniformly spaced pulses to the counter for the duration of said first voltage level, said gating circuit being closed by the second voltage level, a trigger circuit responsive to said passed pulses and having its output in circuit with said horizontal beam deflection means whereby horizontal sweep traces are generated on said cathode-ray tube indicator in synchronism with said passed pulses, means for applying the detected pulse signals to said vertical beam deflection means whereby the first of said detected signals occurs at the beginning of the horizontal sweep traces, said counter being adjusted such that the second detected signal is visible on the face of said cathode-ray tube indicator for a given number of said uniformly spaced pulses and not visible thereon for a count of one pulse less than said given number.

3. The system in accordance with claim 2 wherein the voltage level producing means comprises a bistable multivibrator.

4. In a receiver system including means for detecting recurring pulsed radio-frequency signals, means for measuring the time interval between two successive recurring pulse signals comprising, means for generating uniformly spaced pulses at a prescribed frequency, a decade counter adapted to produce a single output pulse in response to a preset number of said uniformly spaced pulses, a bistable multivibrator alternately responsive to the first detected signal and the output of said decade counter for producing respective first and second voltage levels at the output of the bistable multivibrator, a cathode-ray tube indicator having horizontal and vertical beam deflection means, a gating circuit interconnecting said decade counter and the prescribed frequency generating means and responsive to said first output voltage level whereby said gating circuit is opened to pass the uniformly spaced pulses to said counter for the duration of said first voltage level, said gating circuit being closed for the duration of the second voltage level, a trigger circuit responsive to said passed pulses and having its output in circuit with said horizontal beam deflection means whereby horizontal sweep traces are generated in synchronism with the passed pulses, means for applying the detected signals to said vertical deflection means whereby the first of said detected signals occurs at the beginning of the horizontal sweep traces, said decade counter being adjusted such that the second detected signal is visible on the face of said cathode-ray tube indicator by a given number of said uniformly spaced pulses and not visible thereon for a count of one pulse less than said given number.

5. The system in accordance with claim 4 wherein said uniformly spaced pulses occur at a frequency of 100 kc.

References Cited in the file of this patent

UNITED STATES PATENTS 2,844,790     Thompson et al.     July 22, 1958